O. E. BYRON.
COUPLING.
APPLICATION FILED FEB. 23, 1917.

1,234,869.

Patented July 31, 1917.

INVENTOR
Orra E. Byron
BY Ralzemond A. Parker ATTORNEY

UNITED STATES PATENT OFFICE.

ORRA E. BYRON, OF DETROIT, MICHIGAN, ASSIGNOR TO STEPHEN A. GRIGGS, OF WALKERVILLE, ONTARIO, CANADA.

COUPLING.

1,234,869.　　　　　Specification of Letters Patent.　　Patented July 31, 1917.

Application filed February 23, 1917. Serial No. 150,341.

*To all whom it may concern:*

Be it known that I, ORRA E. BYRON, a citizen of the United States, residing at Detroit, county of Wayne, State of Michigan, have invented a certain new and useful Improvement in Couplings, and declare the following to be a full, clear, and exact description of the same, such as will enable others skilled in the art to which it pertains to make and use the same, reference being had to the accompanying drawings, which form a part of this specification.

This invention relates to couplers, especially couplers between two road vehicles.

It comprises a very simple device in which the two coupling members are brought together and connected and can be locked in this position.

In the drawings,—

Figure 1:
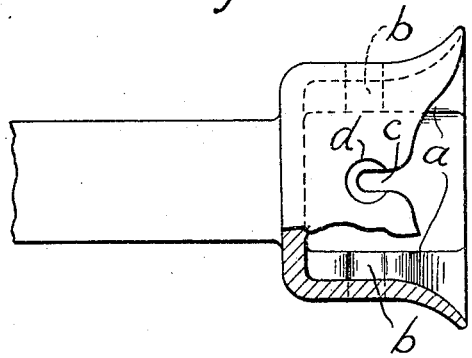
Figure 1 is a plan view of the female member, partly in section.
Figure 3:
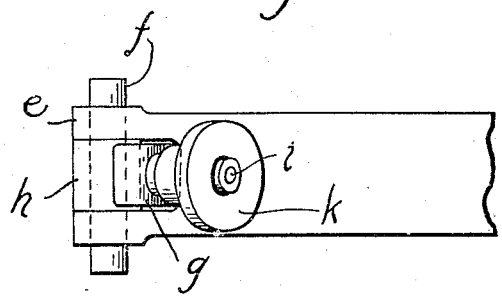
Fig. 3 is a plan view of the male member.
Figure 2:
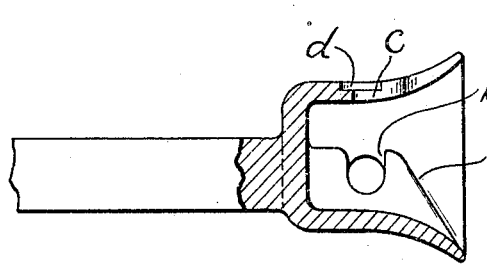
Fig. 2 is a vertical section of the female member.
Figure 4:
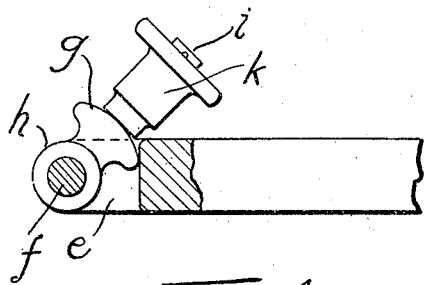
Fig. 4 is a vertical section of the male member.
Figure 5:
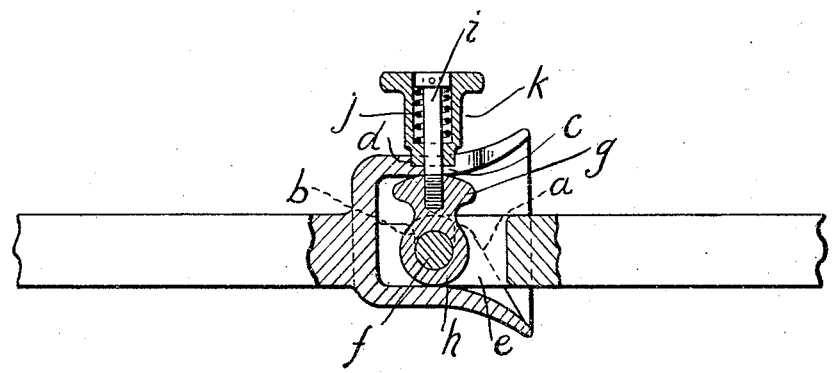
Fig. 5 is a vertical section of the two members interlocked.

The female member comprises a bell-like head having at its sides inside, a pair of shoulders $a$, $a$, beveled on the forward side, and each provided with a recess or cradle $b$ back of the sloping forward side. The top of the bell is cut away at the rim while at the center of this cut-away portion is a reentrant recess $c$ terminating in a part-circular countersink $d$.

The male member comprises a perforated and forked end $e$ through the perforations in whose arms passes the pin $f$ projecting beyond the arms at each side. Between the arms of the forked end is a sleeve $h$ pivoted upon the pin $f$. The sleeve is provided with a laterally projecting segmental head or cam $g$. Radially into this threads a bolt $i$ encircled by a coil spring $j$ that abuts against the head of the bolt at one end and against the sliding sleeve $k$ at the other end.

It is evident that when the two coupling members are alined, or substantially alined, the ends of the cross pin $f$ will strike the beveled face of the shoulders $a$ when the two coupling heads are moved toward each other and these pins $f$ will drop into the cradles $b$ which will connect the two coupling members for the purpose of pushing or pulling, but the members are not thereby securely interlocked. This, however, is easily effected by reason of throwing over to vertical position the locking device. This can easily be done, the sleeve $k$ rising slightly when striking the coupling head, allowing it to then drop into the countersink $d$ where the spring $j$ tends to keep the lock in place. It will be evident that the cam $g$ bearing against the inside of the female coupling member absolutely prevents the pin ends bounding out of the cradles as long as the locking devices are in vertical position.

What I claim is:

1. In a coupler, the combination of a female coupling head or socket provided on the inside with a beveled shoulder and a cradle to the rear thereof, a male coupling member provided with a projecting pin adapted to strike said shoulder on the beveled side and ride thereover and drop into the cradle, and means on the male member for preventing relative up and down movement between the male and female members after the pin has dropped behind the shoulder.

2. In a coupler, the combination of a female member having at one side a shoulder beveled in front and providing a cradle at the rear, a male member provided with a projecting pin adapted to ride over the bevel on the shoulder and drop into the cradle, and a cam on the male member which can be turned up to fill the space between the male and female members, thereby preventing the pin from jumping out of the cradle.

3. In a coupler, the combination of a female member in the form of a bell-like head, a shoulder at the side of said head beveled in front and provided with a cradle to the rear, the said head being provided with a slot about 90 degrees removed from the shoulder, a male coupling member provided with a projecting pin adapted to ride over the bevel of said shoulder and drop into the cradle, a cam adapted to be turned up and having an attachment engaging in said slot, thereby preventing the pin from jumping out of the cradle, and means for retaining the said cam in said turned up position.

4. In a coupler, the combination of a female member in the form of a bell-shaped head, a shoulder beveled at its forward portion and having a cradle to the rear, the said head being provided with a slot substantially 90 degrees removed from the shoulder terminating in a countersink, a male member provided with a projecting pin, a cam swiveled on the male member and provided with a bolt, a locking sleeve reciprocating on the bolt, said bolt being arranged to pass through the slot in the female coupling head and the cam, bolt and sleeve turned up into vertical position to bring the locking sleeve into the countersink, locking the pin in the cradle.

5. In a coupling head, the combination of a female member in the form of a bell having on the inside at each side a shoulder beveled in front and having a cradle at the rear, a male member having a forked end with a pin passing through and projecting at each side of the arms of the fork, said projecting portions of the pin adapted to ride over the bevel of the shoulders and drop into the cradle, and a locking device swiveled on the pin between the arms and adapted to be turned up to form a spacer between the inside of the top wall of the female member and the pin so as to prevent the pin ends jumping out of the cradle.

6. In a coupling head, the combination of a female coupling head in the form of a bell, a pair of shoulders inside of the bell at each side provided with beveled front portions and a cradle at the rear of each, said bell being provided with a slot in the top, a male member having a forked end with a cross pin passing through the forks and projecting to the sides, a locking device swiveled on the pin between the arms of the forked end and comprising a sleeve, a cam, a radially projecting bolt and a sliding sleeve with a spring for tending to press the sleeve against the cam, the said locking device being arranged to be turned over into the slot to allow the cam to form a spacer between the pin and the inside wall of the bell to avoid the pin ends jumping out of the cradle.

In testimony whereof, I sign this specification.

ORRA E. BYRON.

Copies of this patent may be obtained for five cents each, by addressing the "Commissioner of Patents, Washington, D. C."